United States Patent
Sato et al.

(10) Patent No.: US 8,573,821 B2
(45) Date of Patent: Nov. 5, 2013

(54) VEHICLE LAMP

(75) Inventors: Noriko Sato, Shizuoka (JP); Naoki Uchida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 152 days.

(21) Appl. No.: 13/323,982

(22) Filed: Dec. 13, 2011

(65) Prior Publication Data

US 2012/0147618 A1 Jun. 14, 2012

(30) Foreign Application Priority Data

Dec. 14, 2010 (JP) .................................. 2010-277706

(51) Int. Cl.
*F21V 7/00* (2006.01)

(52) U.S. Cl.
USPC ............ 362/517; 362/514; 362/518; 362/523

(58) Field of Classification Search
USPC .......... 362/512, 513, 514, 517, 518, 523, 526
See application file for complete search history.

(56) References Cited

U.S. PATENT DOCUMENTS

| | | | |
|---|---|---|---|
| 7,264,387 B1 | 9/2007 | McCarter et al. | |
| 7,866,863 B2 * | 1/2011 | Tanaka | 362/518 |
| 8,038,334 B2 * | 10/2011 | Ishida | 362/518 |
| 2008/0002419 A1 | 1/2008 | Oyama | |

FOREIGN PATENT DOCUMENTS

| | | |
|---|---|---|
| DE | 10224812 A1 | 12/2003 |
| DE | 102005014754 A1 | 10/2006 |
| EP | 1870633 A1 | 12/2007 |
| EP | 2119959 A1 | 11/2009 |
| EP | 2182270 A2 | 5/2010 |
| EP | 2386795 A1 | 11/2011 |
| JP | 2009277481 A | 11/2009 |

OTHER PUBLICATIONS

English Patent Abstract of JP 2009277481 from esp@cenet, Publication date Nov. 26, 2009 (1 Page).
Extended European Search Report Issued in European Application No. 11193383.4, Dated Apr. 4, 2012 (7 Pages).

* cited by examiner

*Primary Examiner* — Stephen F Husar
(74) *Attorney, Agent, or Firm* — Osha Liang LLP

(57) ABSTRACT

A vehicle lamp has a light source having an edge extending linearly, a first reflector, and a second reflector. The vehicle lamp forms a light distribution pattern having cut-off lines at an upper end section thereof by sequentially reflecting light from the light source using the first and second reflectors. An edge of the light source is disposed so as to extend in the horizontal direction. A first reflecting surface of the first reflector is formed of a curved surface, and shaped such that, when an image of the light source formed on the first reflecting surface of the first reflector is viewed from respective points on a first reflecting surface of the second reflector, an edge portion of the image of the light source corresponding to the edge of the light source appears to be inclined with respect to the horizontal direction.

7 Claims, 9 Drawing Sheets

VEHICLE LAMP

CROSS REFERENCE TO RELATED APPLICATION(S)

The present disclosure relates to the subject matter contained in Japanese Patent Application No. 2010-277706 filed on Dec. 14, 2010, which is incorporated herein by reference in its entirety.

FIELD

Embodiments of the present invention relate to a vehicle lamp configured so as to form a light distribution pattern having cut-off lines at the upper end section thereof by sequentially reflecting the light from a light source having an edge extending linearly using first and second reflectors.

BACKGROUND

A vehicle lamp configured to form a light distribution pattern by sequentially reflecting the light from a light source using first and second reflectors is widely known.

For example, JP-A-2009-277481 discloses a vehicle lamp in which the reflecting surface of a first reflector is formed of an oval surface and the reflecting surface of a second reflector is formed of a parabolic surface.

In the vehicle lamp disclosed in JP-A-2009-277481, a shade is disposed between the first reflector and the second reflector to shield part of the reflected light from the first reflector, whereby cut-off lines are formed at the upper end section of a light distribution pattern.

The vehicle lamp disclosed in JP-A-2009-277481 may have the following characteristics. Because the shade is required to be disposed to form the cut-off lines, the number of components is increased by components associated with the shade. Furthermore, because part of the reflected light from the first reflector is shielded by the shade, the utilization efficiency of the luminous flux of the light source cannot be increased.

In one type of vehicle lamp in which the reflecting surface of the first reflector is formed of an oval surface and the reflecting surface of the second reflector is formed of a parabolic surface, the light source thereof is configured so as to have an edge extending linearly, whereby cut-off lines can be formed without using a shade.

However, even if this configuration is adopted, when the edge of the light source extends in the horizontal direction, only a horizontal cut-off line can be formed, but an oblique cut-off line inclined with respect to the horizontal direction cannot be formed.

SUMMARY

One or more embodiments of the present invention provides a vehicle lamp configured so as to form a light distribution pattern having cut-off lines at the upper end section thereof by sequentially reflecting the light from a light source having an edge extending linearly using first and second reflectors, capable of forming cut-off lines without using a shade, and capable of forming an oblique cut-off line even if the edge extends in the horizontal direction.

One or more embodiments of the present invention involve ingeniously designing the shapes of the reflecting surfaces of the first and second reflectors.

A vehicle lamp according to one or more embodiments of the present invention is configured so as to form a light distribution pattern having cut-off lines at the upper end section thereof by sequentially reflecting the light from a light source having an edge extending linearly using first and second reflectors, wherein the edge of the light source is disposed so as to extend in the horizontal direction, the reflecting surface of the first reflector is formed of a curved surface, the shape of which is set so that when the image of the light source formed on the reflecting surface of the first reflector is viewed from the respective points on the reflecting surface of the second reflector, the edge portion of the image of the light source corresponding to the edge of the light source appears to be inclined with respect to the horizontal direction, and the reflecting surface of the second reflector is formed of a curved surface, the shape of which is set so as to form a light distribution pattern having an oblique cut-off line being inclined with respect to the horizontal direction by reflecting the light emitted from the light source and reflected by the first reflector at the respective points on the reflecting surface of the second reflector in the forward direction of the lamp.

The above-mentioned "light source" is not particularly limited to have a specific configuration, provided that the light source has an edge extending linearly. As the "light source," the light source itself may have an edge extending linearly or the light source may have an edge extending linearly that is formed using a diaphragm disposed in the vicinity of the light source itself. As an example of the former, the light-emitting chip of a light-emitting diode or a filament extending linearly can be adopted. As an example of the latter, a light source may be adopted in which the light-emitting chip of a light-emitting diode is surrounded by a peripheral wall and part of the end fringe of this peripheral wall is used as an edge extending linearly.

The specific position at which "the reflecting surface of the first reflector" is formed, the size of the reflecting surface, etc. are not limited particularly. Furthermore, although the curved surface constituting "the reflecting surface of the first reflector" is formed so that the edge portion of the image of the light source is seen inclined with respect to the horizontal direction, the specific value of the inclination angle from the horizontal direction is not limited particularly.

When "the reflecting surface of the second reflector" is formed of a curved surface so that an oblique cut-off line is formed by the light reflected from the respective points on the reflecting surface in the forward direction of the vehicle lamp, the reflection directions of the light from the respective points may be the same or different from one another.

As described in the above configuration, the vehicle lamp according to one or more embodiments is configured so as to form a light distribution pattern having cut-off lines at the upper end section thereof by sequentially reflecting the light from a light source having an edge extending linearly using first and second reflectors, wherein the edge of the light source is disposed so as to extend in the horizontal direction, the reflecting surface of the first reflector is formed of a curved surface, the shape of which is set so that when the image of the light source formed on the reflecting surface of the first reflector is viewed from the respective points on the reflecting surface of the second reflector, the edge portion of the image of the light source corresponding to the edge of the light source appears to be inclined with respect to the horizontal direction, and the reflecting surface of the second reflector is formed of a curved surface, the shape of which is set so as to form a light distribution pattern having an oblique cut-off line being inclined with respect to the horizontal direction by reflecting the light emitted from the light source and reflected by the first reflector at the respective points on the reflecting surface of the second reflector in the forward direction of the lamp, whereby the vehicle lamp can have the following working effects.

More specifically, although the edge of the light source extends in the horizontal direction, the oblique cut-off line can be formed by combining the shapes of the reflecting surfaces of the first and second reflectors. Furthermore, this can be accomplished without using a shade.

With one or more embodiments, the vehicle lamp is configured so as to form a light distribution pattern having cut-off lines at the upper end section thereof by sequentially reflecting the light from a light source having an edge extending linearly using first and second reflectors is capable of forming cut-off lines without using a shade, and is capable of forming an oblique cut-off line even if the edge extends in the horizontal direction.

In the above-mentioned configuration, the first and second reflectors respectively have second reflecting surfaces different from the above-mentioned reflecting surfaces, and a light distribution pattern having a horizontal cut-off line intersecting the oblique cut-off line is formed by sequentially reflecting the light from the light source using the second reflecting surfaces of the first and second reflectors. With this configuration, the main portions of the low-beam light distribution pattern can be formed by a single lamp without using a shade.

The first and second reflectors respectively have third reflecting surfaces different from the reflecting surfaces and the second reflecting surfaces, and a light distribution pattern extending in the horizontal direction below the horizontal cut-off line is formed by sequentially reflecting the light from the light source using the third reflecting surfaces of the first and second reflectors. With this configuration, the low-beam light distribution pattern can be formed by a single lamp without using a shade.

Furthermore, in a configuration equipped with an actuator for moving at least one of the light source, the first reflector and the second reflector, a light distribution pattern without the two cut-off lines can be formed by driving this actuator. Moreover, a low-beam light distribution pattern (or the main portions thereof) and a high-beam light distribution pattern (or the main portions thereof) can be formed selectively by appropriately drive-controlling the actuator.

In this case, when the actuator is driven, the current to be supplied to the light source is increased. With this configuration, the brightness of the high-beam light distribution pattern (or the main portions thereof) can be obtained sufficiently without making the brightness of the low-beam light distribution pattern (or the main portions thereof) higher than necessary.

BRIEF DESCRIPTION OF THE DRAWINGS

Embodiments of the invention will be described with reference to the drawings. The drawings and the associated descriptions are provided to illustrate embodiments of the invention and should not limit the scope of the invention.

DETAILED DESCRIPTION OF THE EMBODIMENTS

One or more embodiments of the present invention will be described below referring to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
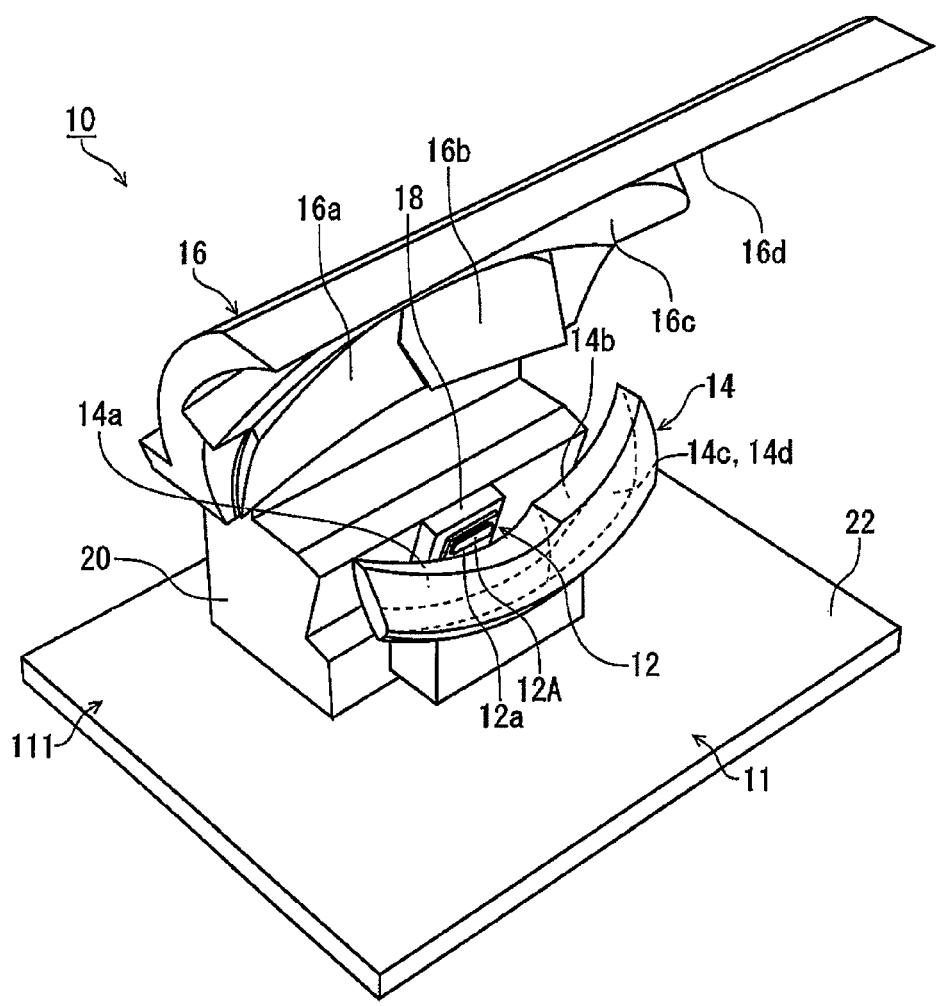
FIG. 1 is a perspective view showing a vehicle lamp according to one or more embodiments of the present invention.
Figure 2:
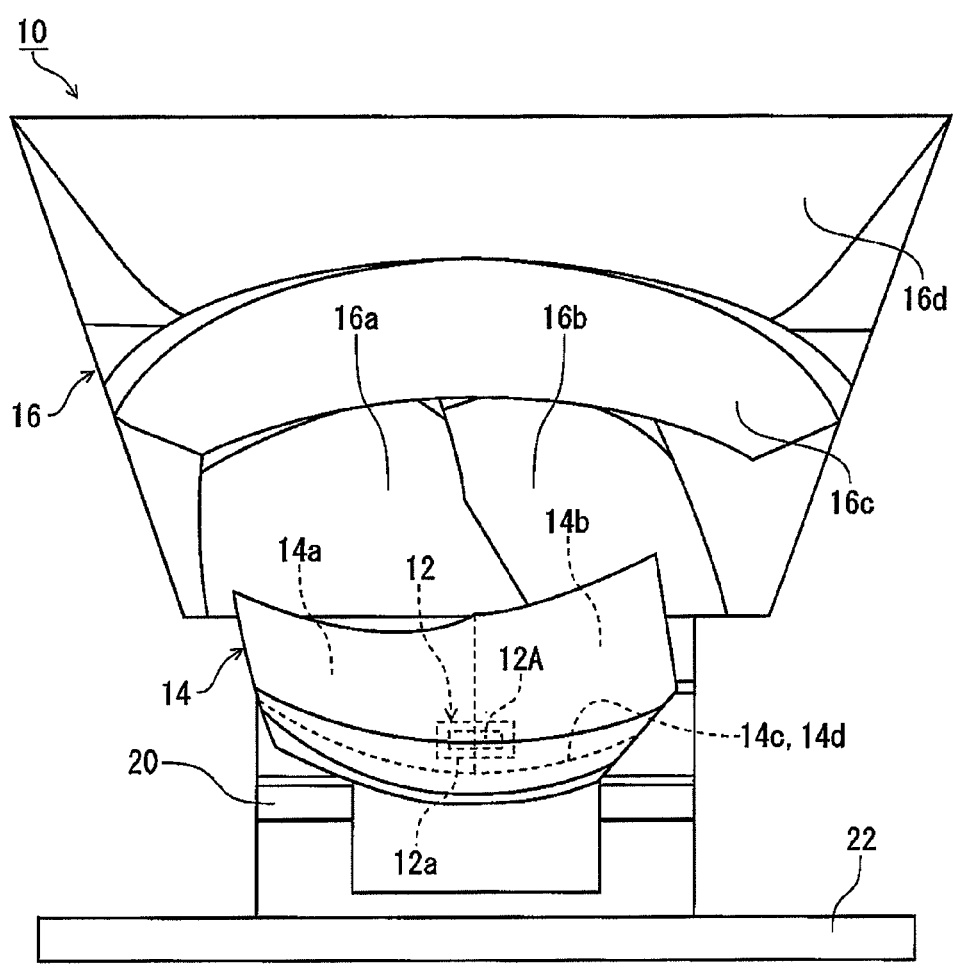
FIG. 2 is a view taken in the direction II of FIG. 1.
Figure 3:
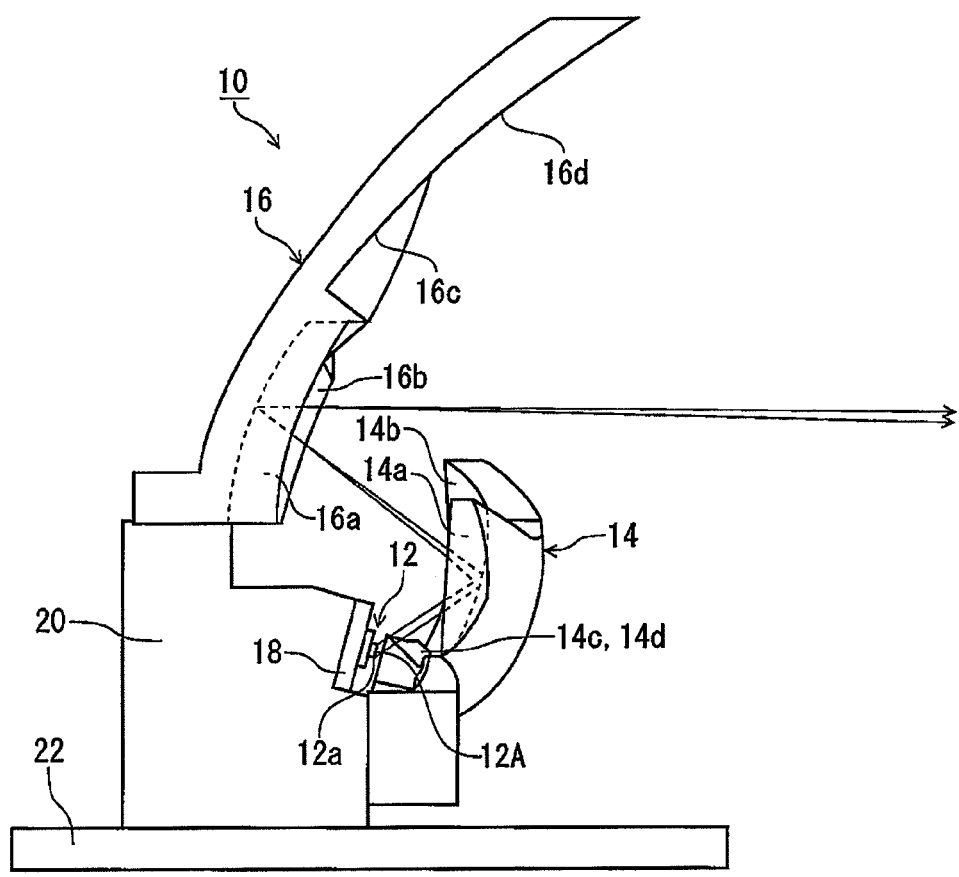
FIG. 3 is a view taken in the direction III of FIG. 1.

FIG. 1 is a perspective view showing a vehicle lamp 10 according to one or more embodiments. Furthermore, FIG. 2 is a view taken in the direction II of FIG. 1, and FIG. 3 is a view taken in the direction III of FIG. 1.

As shown in these figures, the vehicle lamp 10 according to one or more embodiments is equipped with a light-emitting device 12 disposed slightly downward and forward of the lamp; a first reflector 14 for reflecting the light from this light-emitting device 12 rearward or upward of the lamp; a second reflector 16 for reflecting the reflected light from this first reflector 14 forward of the lamp; a supporting plate 18 made of metal to support the light-emitting device 12; and a holder 20 and a base plate 22 for supporting these.

Figure 4A:
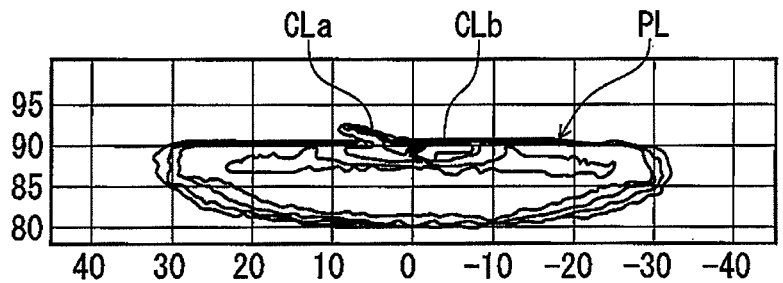
FIG. 4A is a view showing a low-beam light distribution pattern formed on an imaginary vertical screen disposed 25 meters (m) ahead of the vehicle lamp by the light irradiated forward from the vehicle lamp.

In addition, the vehicle lamp 10 is configured so as to form a low-beam light distribution pattern PL having an oblique cut-off line CLa and a horizontal cut-off line CLb in the upper end section thereof as shown in FIG. 4A by sequentially reflecting the light from the light-emitting device 12 using the first and second reflectors 14 and 16. The low-beam light distribution pattern PL is formed as the combined light distribution pattern of four light distribution patterns PLA, PLB, PLC and PLD as shown in FIGS. 4B, 4C, 4D and 4E.

The light-emitting device 12 is formed of a white light-emitting diode and has a horizontal rectangular light-emitting face as a light source 12A. The light source 12A is configured so that four light-emitting chips each having an external shape of a square measuring approximately 1×1 millimeters (mm) are disposed in series in the horizontal direction so as to make approximately close contact with each other and so that the surface thereof is sealed with a thin film. The light source 12A is configured so as to have an edge 12a extending linearly in the horizontal direction at the lower end fringe thereof. Furthermore, the light-emitting device 12 is supported on the supporting plate 18 while the edge 12a of the light source 12A is disposed so as to extend in a direction orthogonal to the front-rear direction of the lamp.

The first reflector 14 has four reflecting surfaces 14a, 14b, 14c and 14d, and the second reflector 16 has four reflecting surfaces 16a, 16b, 16c and 16d. The light emitted from the light source 12A and reflected by the reflecting surfaces 14a, 14b, 14c and 14d of the first reflector 14 are further reflected by the reflecting surfaces 16a, 16b, 16c and 16d of the second reflector 16, respectively.

The reflecting surface 14a of the first reflector 14 is positioned at the obliquely forward right of the light source 12A (at the obliquely forward left of the light source 12A as viewed toward the front of the lamp), the reflecting surface 14b thereof is positioned at the obliquely forward left of the light source 12A, and the reflecting surfaces 14c and 14d thereof are positioned below the reflecting surfaces 14a and 14b.

Moreover, the reflecting surface 16a of the second reflector 16 is positioned at the obliquely rearward right of the light source 12A, the reflecting surface 16b thereof is positioned at the obliquely rearward left of the light source 12A, the reflecting surface 16c thereof is positioned above the reflecting surfaces 16a and 16b, and the reflecting surface 16d thereof is positioned above the reflecting surface 16c.

The reflecting surface 14a of the first reflector 14 is formed of a curved surface, the shape of which is set so that when the image of the light source 12A formed on the reflecting surface 14a is viewed from the respective points on the reflecting surface 16a of the second reflector 16, the edge portion of the image of the light source corresponding to the edge 12a of the light source 12A appears to be inclined with respect to the horizontal direction (this will be described later).

Figure 4B:
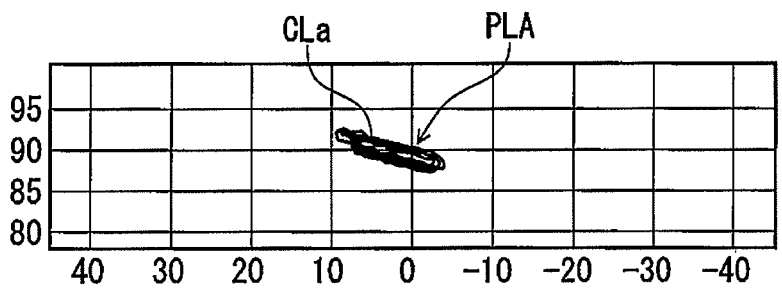
FIGS. 4B, 4C, 4D and 4E are views showing four light distribution patterns constituting the low-beam light distribution pattern.

The reflecting surface 16a of the second reflector 16 is formed of a curved surface, the shape of which is set so as to form a light distribution pattern PLA having an oblique cut-off line CLa being inclined with respect to the horizontal direction as shown in FIG. 4B by reflecting the light emitted from the light source 12A and reflected by the reflecting surface 14a of the first reflector 14 at the respective points on the reflecting surface 16a of the second reflector 16 in the forward direction of the lamp (this will also be described later).

Figure 4C:
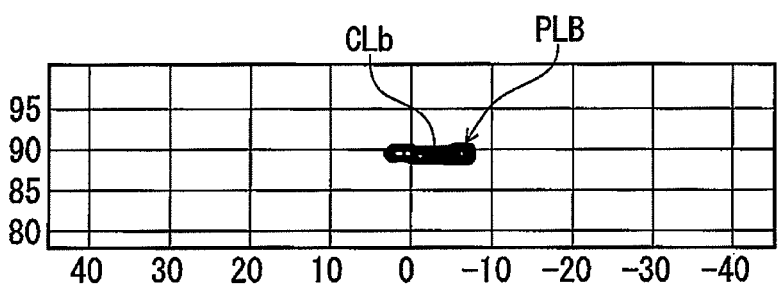

The reflecting surface 14b of the first reflector 14 and the reflecting surface 16b of the second reflector 16 are formed of curved surfaces, the shapes of which are set so as to form a light distribution pattern PLB having a horizontal cut-off line CLb intersecting the oblique cut-off line CLa as shown in FIG. 4C by sequentially reflecting the light from the light source 12A using the reflecting surfaces 14b and 16b.

Figure 4D:
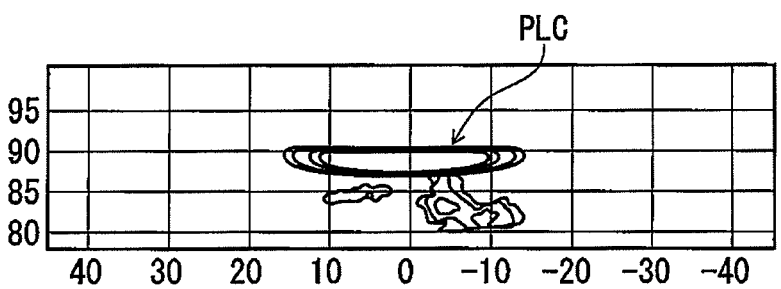
Figure 4E:
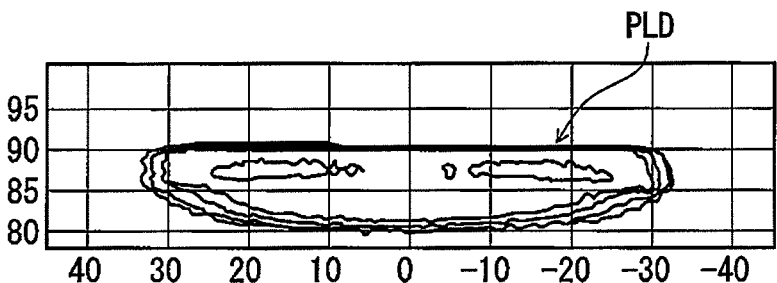

The reflecting surfaces 14c and 14d of the first reflector 14 and the reflecting surfaces 16c and 16d of the second reflector 16 are formed of curved surfaces, the shapes of the curved surfaces are set so as to form light distribution patterns PLC and PLD extending in the horizontal direction below the horizontal cut-off line CLb as shown in FIGS. 4D and 4E by sequentially reflecting the light from the light source 12A using the reflecting surfaces 14c and 16c; 14d and 16d. The light distribution pattern PLC formed by the light sequentially reflected by is the reflecting surfaces 14c and 16c is formed as a small diffusion light distribution pattern, and the light distribution pattern PLD formed by the light sequentially reflected by the reflecting surfaces 14d and 16d is formed as a large diffusion light distribution pattern.

FIGS. 5A to 5D are perspective views showing a procedure for setting the shape of the curved surface constituting the reflecting surface 14a of the first reflector 14 and the shape of the curved surface constituting the reflecting surface 16a of the second reflector 16.

Figure 5A:
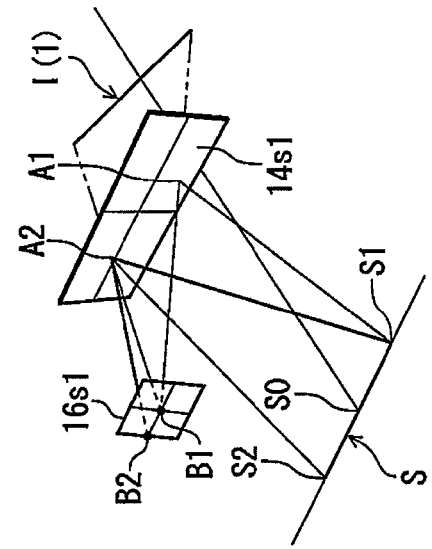
FIGS. 5A to 5D are perspective views showing a procedure for setting the shapes of the curved surfaces constituting the reflecting surfaces of the first and second reflectors of the vehicle lamp.
Figure 6A:
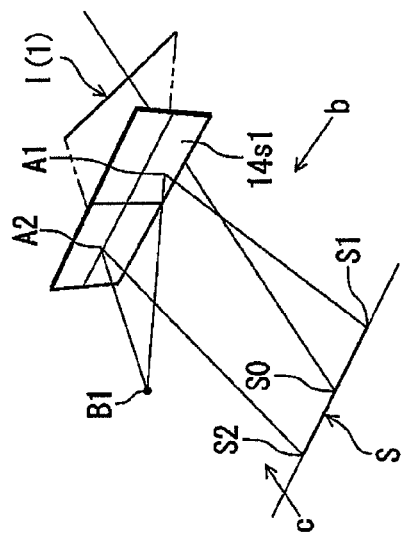
FIGS. 6A to 6C are views showing the details of part of the procedure.
Figure 6B:
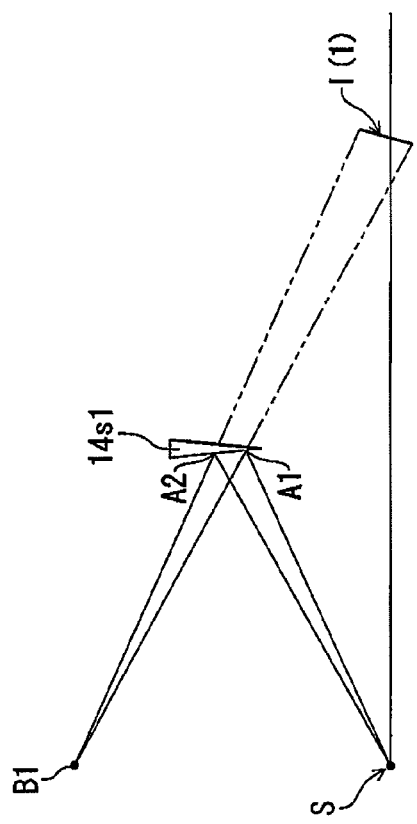
Figure 6C:
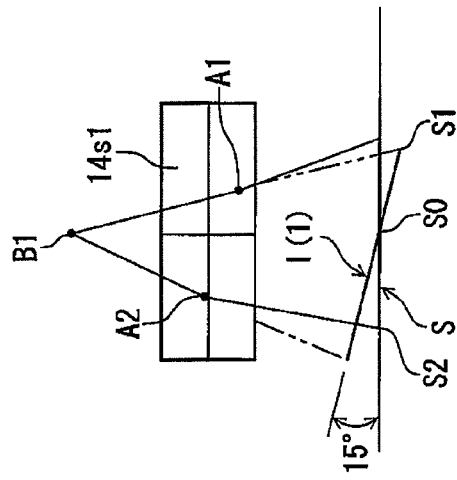

Furthermore, FIGS. 6A to 6C are views showing the details of the step shown in FIG. 5A. FIG. 6A is exactly the same as FIG. 6A, FIG. 6B is a view seen from the arrow b direction of FIG. 6A, and FIG. 6C is a view seen from the arrow c direction of FIG. 6A.

In these figures, only the edge 12a of the light source 12A is shown as a linear light source S. The central point of this linear light source S is designated by S0, the right end point thereof is designated by S1, and the left end point thereof is designated by S2.

First, as shown in FIG. 5A and FIGS. 6A to 6C, a point B1 is set at an appropriate position above the linear light source S, and a surface element 14s1 is set forward and obliquely upward from the linear light source S.

The point B1 is a point that should be located on the reflecting surface 16a of the second reflector 16. Furthermore, the surface element 14s1 is a surface element that should be used as part of the reflecting surface 14a of the first reflector 14. When the surface element is viewed from the point B1, the surface element is set at a position where the linear light source S is reflected. Points where the light beams from both the end points S1 and S2 of the linear light source S are reflected are designated by A1 and A2, respectively.

In addition, the normal direction of the surface element 14s1 at each of the points A1 and A2 is determined so that when a linear light source image (that is, the edge portion of the light source image of the light source 12A, corresponding to the edge 12a thereof) I(1) formed as the virtual image of the linear light source S on the surface element 14s1 is viewed from the point B1, this linear light source image I(1) is seen inclined 15 degree left-upward with respect to the horizontal direction.

Figure 5B:
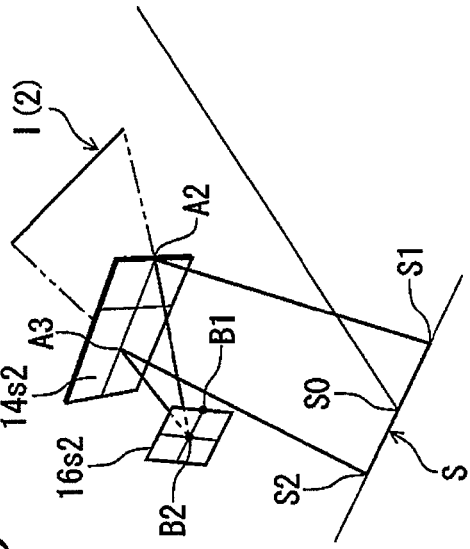

Next, as shown in FIG. 5B, the normal direction of a surface element 16s1 at the point B1 is determined so that the light emitted from the central point S0 of the linear light source S, reflected by the surface element 14s1 and having reached the point B1 is reflected forward of the lamp in the target direction of the light.

Figure 5C:
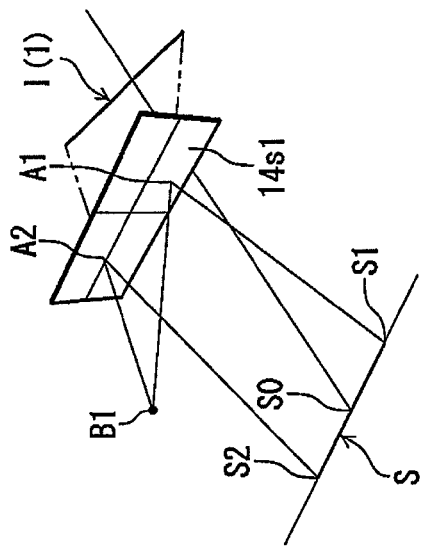

Then, as shown in FIG. 5C, the light emitted from the right endpoint S1 of the linear light source S and reflected at the point A2 on the surface element 14s1 reaches a point on the surface element 16s1, and this point is set as a point B2.

Figure 5D:
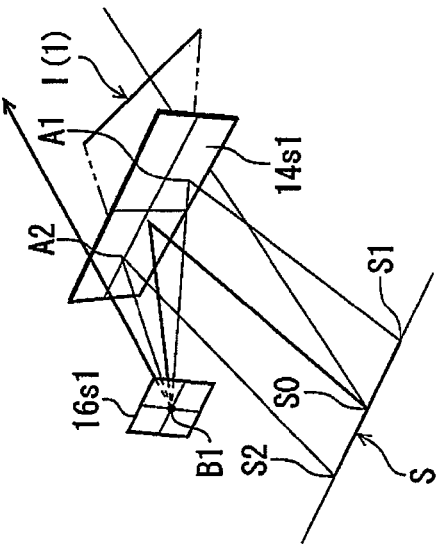

Subsequently, as shown in FIG. 5D, a surface element 14s2 disposed on the left side of the surface element 14s1 and partly overlapping with the surface element 14s1 is newly formed on the basis of a vertical cross-section passing the point A2 on the surface element 14s1. The position of a point A3 at which the light from the left end point S2 of the linear light source S is reflected and the normal direction of the surface element 14s2 at the position are determined so that when a linear light source image I(2) formed as the virtual image of the linear light source S on the surface element 14s2 is viewed from the point B2, this linear light source image I(2) is seen inclined 15 degree left-upward with respect to the horizontal direction.

Furthermore, a surface element 16s2 disposed on the left side of the surface element 16s1 and partly overlapping with the surface element 16s1 is newly formed on the basis of a vertical cross-section passing the point B1 on the surface element 16s1. The normal direction of the surface element 16s2 at the point B2 is determined so that the light emitted from the central point S0 of the linear light source S, reflected by the surface element 14s2 and having reached the point B2 is reflected forward of the lamp in the target direction of the light.

Similarly, points A4, A5, . . . following the points A1, A2 and A3 and points B3, B4, . . . following the points B1 and B2 are formed, whereby a sequence of points A and a sequence of points B are formed. Furthermore, the shape of the curved surface constituting the reflecting surface 14a of the first reflector 14 and the shape of the curved surface constituting the reflecting surface 16a of the second reflector 16 are determined by generating the sequence of points A and the sequence of points B in a plurality of stages in the vertical direction, respectively.

As described above, the shapes of the curved surfaces constituting the reflecting surface 14b of the first reflector 14 and the reflecting surface 16b of the second reflector 16 are set so that the light distribution pattern PLB having the horizontal cut-off line CLb is formed by sequentially reflecting the light from the light source 12A using the reflecting surfaces 14b and 16b. The setting of the shapes of the curved surfaces is performed by forming the surface elements 14s1 and 14s2 so that the linear light source images I(1) and I(2) remain extended in the horizontal direction when the linear light source images I(1) and I(2) formed as the virtual images of the linear light source S on the surface elements 14s1 and 14s2 are viewed from the points B1 and B2.

Figure 7A:
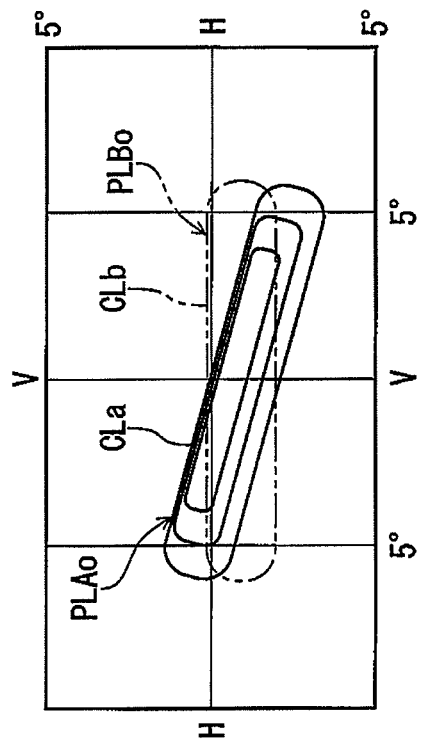
FIGS. 7A to 7C are views illustrating how the two light distribution patterns shown in FIGS. 4B and 4C are formed.
Figure 7C:
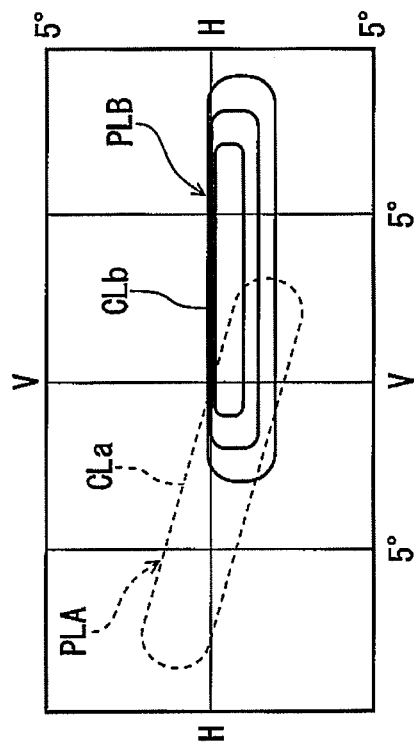
Figure 7B:
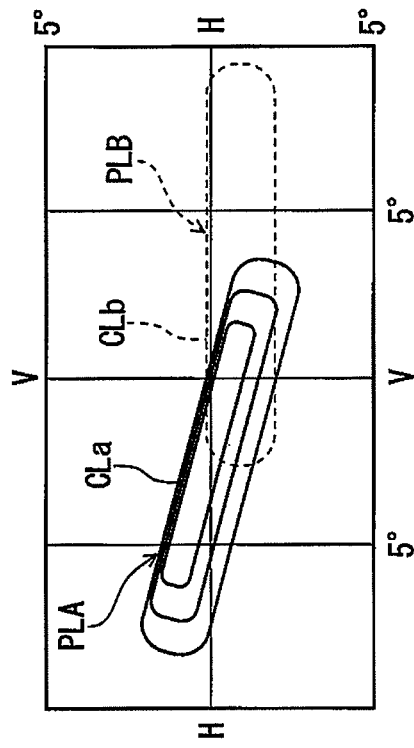

FIGS. 7A to 7C are views illustrating how the two light distribution patterns PLA and PLB shown in FIGS. 4B and 4C. are formed.

The light distribution pattern PLAo indicated by a solid line in FIG. 7A is a light distribution pattern formed in the case that the normal direction at each point on the reflecting surface 16a of the second reflector 16 is set so that the light reflected from each point on the reflecting surface 16a is directed to the front of the lamp.

Furthermore, the light distribution pattern PLBo indicated by a two-dot chain line in FIG. 7A is a light distribution pattern formed in the case that the normal direction at each point on the reflecting surface 16b of the second reflector 16 is set so that the light reflected from each point on the reflecting surface 16b is directed to the front of the lamp.

The light distribution pattern PLA indicated by a solid line in FIG. 7B is a light distribution pattern corresponding to the light distribution pattern PLA shown in FIG. 4B and formed in the case that the normal direction at each point on the reflecting surface 16a of the second reflector 16 is set so that the light reflected from each point on the reflecting surface 16a is directed slightly obliquely left upward with respect to the front direction of the lamp.

The light distribution pattern PLB indicated by a solid line in FIG. 7C is a light distribution pattern corresponding to the light distribution pattern PLB shown in FIG. 4C and formed in the case that the normal direction at each point on the reflecting surface 16b of the second reflector 16 is set so that the light reflected from each point on the reflecting surface 16b is directed slightly rightward with respect to the front direction of the lamp.

In FIG. 7B, the position of the light distribution pattern PLB is indicated by a broken line, and in FIG. 7C, the position of the light distribution pattern PLA is also indicated by a broken line.

Next, the functional effects of one or more embodiments will be described below.

The vehicle lamp 10 according to one or more embodiments is configured so as to form the low-beam light distribution pattern PL having the oblique cut-off line CLa and the horizontal cut-off line CLb in the upper end section thereof by sequentially reflecting the light from the light source 12A having the edge 12a extending linearly using the first and second reflectors 14 and 16. The light source 12A is disposed so that the edge 12a thereof extends in the horizontal direction. Furthermore, the reflecting surface 14a of the first reflector 14 is formed of a curved surface, the shape of which is set so that when the image of the light source 12A formed on the reflecting surface 14a of the first reflector 14 is viewed from the respective points B1, B2, . . . on the reflecting surface 16a of the second reflector 16, the edge portions (that is, the linear light source images I(1), I(2), . . . ) of the images of the light source corresponding to the edge 12a (that is, the linear light source S) of the light source 12A appear to be inclined with respect to the horizontal direction. Moreover, the reflecting surface 16a of the second reflector 16 is formed of a curved surface, the shape of which is set so as to form the light distribution pattern PLA having the oblique cut-off line CLa being inclined with respect to the horizontal direction by reflecting the light emitted from the light source 12A and reflected by the first reflector 14 at the respective points B1, B2, . . . on the reflecting surface 16a of the second reflector 16 in the forward direction of the lamp. Hence, the following functional effects can be obtained.

Although the edge 12a of the light source 12A extends in the horizontal direction, the oblique cut-off line CLa can be formed by combining the shapes of the respective reflecting surfaces of the first and second reflectors 14 and 16. Furthermore, the formation of the cut-off line can be accomplished without using a shade.

With one or more embodiments described above, in the vehicle lamp 10 configured so as to form the low-beam light distribution pattern PL having the oblique cut-off line CLa and the horizontal cut-off line CLb at the upper end section thereof by sequentially reflecting the light from the light source 12A having the edge 12a extending linearly using the first and second reflectors 14 and 16, the oblique cut-off line CLa and the horizontal cut-off line CLb can be formed without using a shade, and the oblique cut-off line CLa can be formed even if the edge 12a extends in the horizontal direction.

Moreover, in one or more embodiments, the first and s second reflectors 14 and 16 have the second reflecting surfaces 14b and 16b, respectively, and the light distribution pattern PLB having the horizontal cut-off line CLb intersecting the oblique cut-off line CLa is formed by sequentially reflecting the light from the light source 12A using the reflecting surfaces 14b and 16b. Hence, the main portions of the low-beam light distribution pattern PL can be formed by a single lamp without using a shade.

Still further, in one or more embodiment, the first and second reflectors 14 and 16 have third reflecting surfaces 14c and 16c; 14d and 16d, respectively. The first and second reflectors 14 and 16 are configured so as to form the light distribution patterns PLC and PLD extending below the horizontal cut-off line CLb in the horizontal direction by sequentially reflecting the light from the light source 12A using these reflecting surfaces 14c and 16c; 14d and 16d. Hence, the low-beam light distribution pattern PL can be formed by a single lamp without using a shade.

In the above-mentioned embodiments, it has been described that the reflecting surfaces 14a, 14b, 14c and 14d of the first reflector 14 and the reflecting surfaces 16a. 16b, 16c and 16d of the second reflector 16 are each formed of a single curved surface. However, all or some of these reflecting surfaces 14a to 14d and 16a to 16d may be formed of a plurality of reflective elements.

In the above-mentioned embodiments, the configuration of the vehicle lamp 10 for left-hand traffic has been described. However, in the case that a vehicle lamp is configured so as to be bilaterally symmetric with the vehicle lamp 10, this vehicle lamp can be adapted to right-hand traffic.

Next, one or more modified embodiments of the above-mentioned embodiments will be described below.

Figure 8:
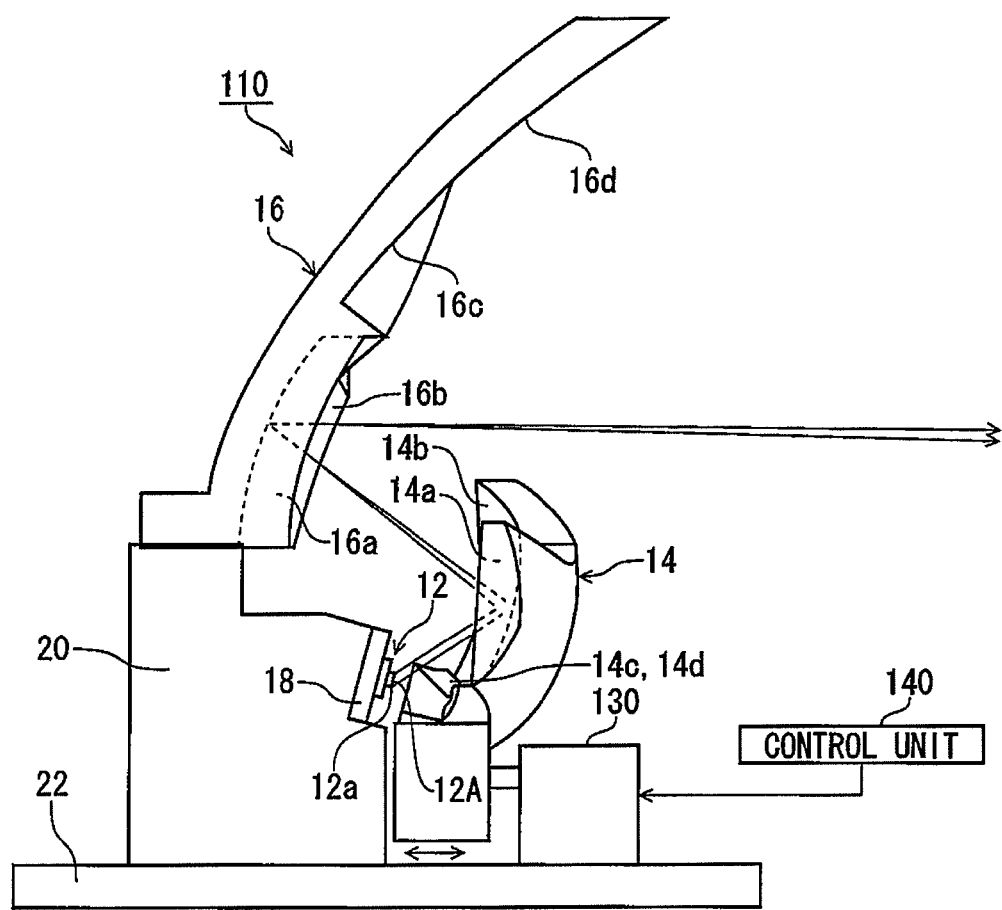
FIG. 8, similar to FIG. 3, shows a vehicle lamp according to modified embodiments of the above-mentioned embodiments.

FIG. 8, similar to FIG. 3, shows a vehicle lamp 110 according to one or more modified embodiments.

As shown in the figure, the basic configuration of this vehicle lamp 110 is similar to that of the vehicle lamp 10 according to the above-mentioned embodiments. However, the vehicle lamp 110 is different from the vehicle lamp 10 according to the above-mentioned embodiments in that the first reflector 14 thereof is configured so as to be movable in the front-rear direction of the lamp and that the vehicle lamp 110 is equipped with an actuator 130 for moving the first reflector 14 in the front-rear direction of the lamp and a control unit 140 for drive-controlling the actuator.

The control unit 140 is configured so as to drive the actuator 130 using an input signal from a beam selection s switch, not shown. In addition, the actuator 130 is configured so as to move the first reflector 14 between its low-beam position shown in the figure and its high-beam position slightly displaced rearward from the low-beam position using a drive signal from the control unit 140. FIGS. 9A to 9E are views showing light distribution patterns formed when the first reflector 14 is moved to the high-beam position.

Figure 9A:
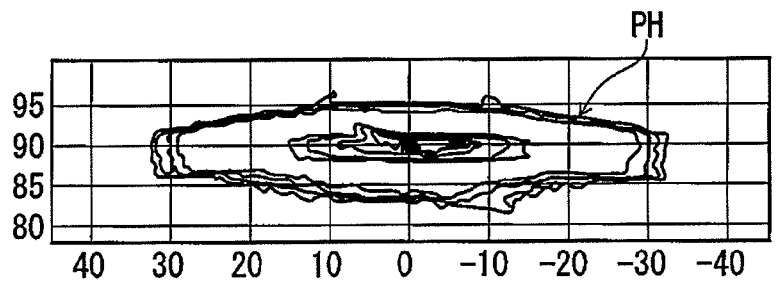
FIG. 9A is a view showing a high-beam light distribution pattern that is formed selectively on the imaginary vertical screen by the light irradiated forward from the vehicle lamp according to the modified embodiments.
Figure 9B:
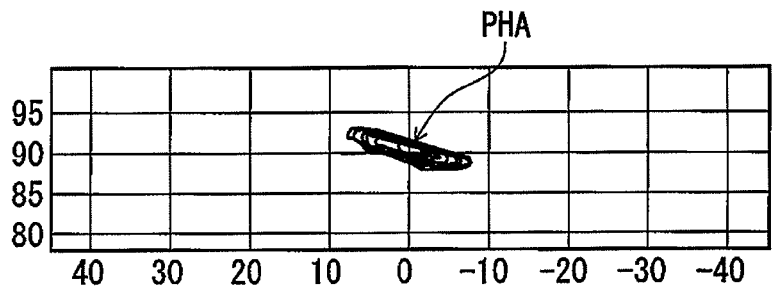
FIGS. 9B, 9C, 9D and 9E are views respectively showing four light distribution patterns constituting the high-beam light distribution pattern.
Figure 9C:
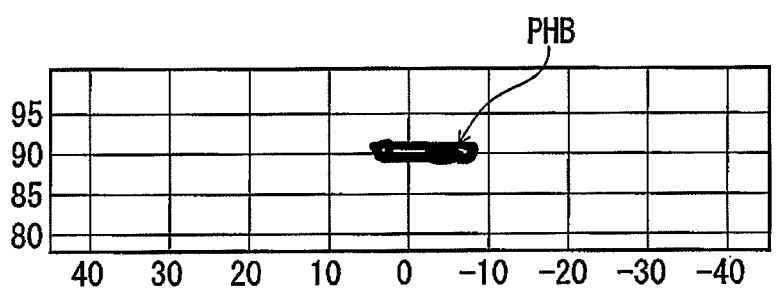
Figure 9D:
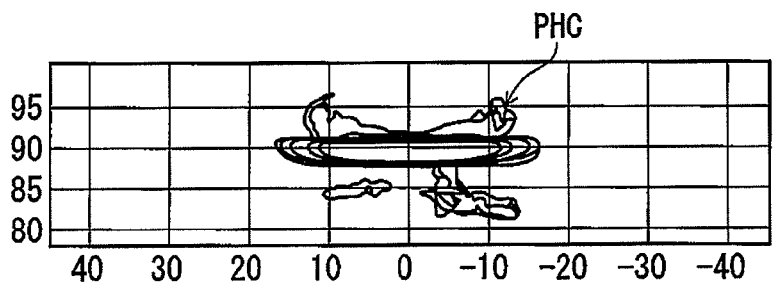
Figure 9E:
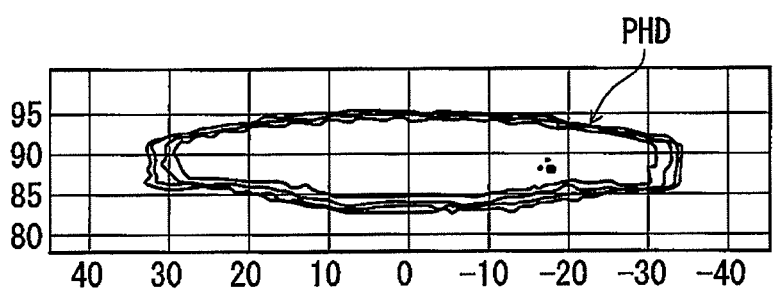

As shown in FIG. 9A, when the first reflector 14 is moved to the high-beam position, the oblique cut-off line CLa and the horizontal cut-off line CLb formed at the upper end section of the low-beam light distribution pattern PL disappear, and a high-beam light distribution pattern PH is formed.

This high-beam light distribution pattern PH is supposed to be formed as a combined light distribution pattern of the four light distribution patterns PHA, PHB, PHC and PHD shown in FIGS. 9B, 9C, 9D and 9E. The four light distribution patterns PHA, PHB, PHC and PHD correspond to the four light distribution patterns PLA, PLB, PLC and PLD shown in FIGS. 4B, 4C, 4D and 4E, respectively.

The amount of the movement of the first reflector 14 from the low-beam position to the high-beam position is set to a value (for example, approximately 0.5 mm) at which the luminosity at the center of the high-beam light distribution PH becomes the highest.

The control unit 140 is configured so that when the first reflector 14 is moved to the high-beam position by driving the actuator, the current to be supplied to the light-emitting device 12 is increased simultaneously at this time.

Next, the functional effects of one or more modified embodiments will be described below.

The vehicle lamp 110 according to one or more modified embodiments is configured so that the first reflector 14 is moved between the low-beam position and the high-beam position by driving the actuator 130. Hence, the low-beam light distribution pattern PL and the high-beam light distribution pattern PH can be formed selectively using a single lamp.

Furthermore, in one or more modified embodiments, since the control unit 140 is configured so that when the first reflector 14 is moved to the high-beam position by driving the actuator, the current to be supplied to the light-emitting device 12 is increased simultaneously at this time. Hence, the brightness of the high-beam light distribution pattern PH can be obtained sufficiently without making the brightness of the low-beam light distribution pattern PL higher than necessary.

One or more modified embodiments is configured so that the low-beam light distribution pattern PL is switched to the high-beam light distribution pattern PH by moving the first reflector 14 rearward. However, instead of this configuration, it may be possible to adopt a configuration in which the switching is performed by moving the first reflector 14 downward (for example, approximately 0.5 mm); a configuration in which the switching is performed by moving the second reflector 16 forward (for example, approximately 1 mm); a configuration in which the switching is performed by moving the light source 12A forward (for example, approximately 0.5 mm); a configuration in which the switching is performed by moving the light source 12A upward (for example, approximately 0.5 mm); etc.

The numerical values, provided as data in one or more embodiments described above, are taken as only examples. Hence, it is a matter of course that the numerical values may be set to different values as necessary. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle lamp comprising:
a light source having an edge extending linearly;
a first reflector; and
a second reflector,
wherein the vehicle lamp forms a light distribution pattern having cut-off lines at an upper end section thereof by sequentially reflecting light from the light source using the first and second reflectors,
wherein the edge of the light source is disposed so as to extend in the horizontal direction,
wherein a first reflecting surface of the first reflector is formed of a curved surface, and shaped such that, when an image of the light source formed on the first reflecting surface of the first reflector is viewed from respective points on a first reflecting surface of the second reflector, an edge portion of the image of the light source corresponding to the edge of the light source appears to be inclined with respect to the horizontal direction, and
wherein the first reflecting surface of the second reflector is formed of a curved surface, and shaped to form a light distribution pattern having an oblique cut-off line inclined with respect to the horizontal direction by reflecting the light emitted from the light source and reflected by the first reflector at the respective points on the first reflecting surface of the second reflector in a forward direction of the lamp.

2. The vehicle lamp according to claim 1, wherein
the first and second reflectors respectively have second reflecting surfaces different from the first reflecting surfaces, and
a light distribution pattern having a horizontal cut-off line intersecting the oblique cut-off line is formed by sequentially reflecting the light from the light source using the second reflecting surfaces of the first and second reflectors.

3. The vehicle lamp according to claim 2, wherein
the first and second reflectors respectively have third reflecting surfaces different from the first reflecting surfaces and the second reflecting surfaces, and
a light distribution pattern extending in the horizontal direction below the horizontal cut-off line is formed by sequentially reflecting the light from the light source using the third reflecting surfaces of the first and second reflectors.

4. The vehicle lamp according to claim 2, further comprising: an actuator that moves at least one of the light source, the first reflector, and the second reflector.

5. The vehicle lamp according to claim 4, wherein, when the actuator is driven, current supplied to the light source is increased.

6. The vehicle lamp according to claim 3, further comprising: an actuator that moves at least one of the light source, the first reflector, and the second reflector.

7. The vehicle lamp according to claim 6, wherein, when the actuator is driven, current supplied to the light source is increased.

* * * * *